Jan. 28, 1969       W. L. HUGHES ET AL       3,424,620
FUEL CELL
Filed Nov. 27, 1964

HYDROGEN   OXYGEN
   IN         IN

INVENTORS.
WILLIAM L. HUGHES
CLAUDE M. SUMMERS
HANSELL J. ALLISON

BY *Head & Johnson*

ATTORNEYS

United States Patent Office 3,424,620
Patented Jan. 28, 1969

3,424,620
FUEL CELL
William L. Hughes, Claude M. Summers, and Hansell Jack Allison, Stillwater, Okla., assignors to Oklahoma State University of Agriculture & Applied Science, Stillwater, Okla., a corporation of Oklahoma
Filed Nov. 27, 1964, Ser. No. 414,204
U.S. Cl. 136—86    6 Claims
Int. Cl. H01m 27/04

This invention relates to a fuel cell. More particularly, the invention relates to a fuel cell of the type wherein gases are utilized for the direct production of electrical energy, the cell being characterized by the provision of increased contact of the gas with the electrodes.

In recent years there has been extensive activity in the field of fuel cells. Generally, a fuel cell may be defined as a device for directly converting the chemical energy of a fuel, such as hydrogen, into electrical energy. In a typical fuel cell, a combustible gas such as hydrogen is introduced into a cell to contact an electrode. At the same time, oxygen or some oxygen containing gas is introduced through a second opening in the cell to contact a different electrode, the two electrodes being electrolytically connected through an electrolyte solution. As a result of the chemical action in the cell, DC electrical energy is produced directly from the reaction of hydrogen and oxygen.

The conversion efficiency of such fuel cells, particularly as a ratio of their size and weight, is determined to a great extent, in addition to other factors, by the effectiveness of the gas contact with the electrodes. Typically, electrodes are made of porous metals to greatly amplify their contact area. The energy producing capacity of cells is more or less proportional to the total contact area of the electrodes subject to gas contact as the gas passes through the cells.

Is is therefore an object of this invention to provide a structure for fuel cells wherein the intimacy of contact between the electrodes and the fuel gas is greatly increased.

More particularly, an object of this invention is to provide a fuel cell having two spaced electrodes immersed in electrolyte wherein the electrodes are of a geometrical configuration greatly increasing the area thereof subject to the contact of gas flowing through the cell.

These are the basic objects of the invention. More specific objects will be set forth and a greater understanding of the invention will be had by referring to the following description and claims, taken in conjunction with the following attached drawings in which:

This invention may be described as a fuel cell having improved electrode configuration. More particularly, but not by way of limitation, the invention may be described as a fuel cell comprising an upright pressure containing enclosure having spaced apart gas inlets in the bottom and spaced apart gas outlets in the top, a first and a second spaced apart upright electrode positioned in the enclosure, each of the electrodes having an upright back plate member, a plurality of downwardly slanted plates each affixed at the higher end to the back plate, the downwardly slanted plates substantially equally spaced from the parallel to each other and each having at least one opening therein adjacent the end affixed to the back plate, and a plurality of parallel upwardly slanted plates each affixed at the lower end of the back plate, the upper outer end of each of the upwardly slanted plates terminating adjacent to the lower surface of one of the downwardly slanted plates, the plates of each electrode extending over one of the gas inlet openings in the botom of the enclosure and under one of the gas outlet openings in the top of the enclosure, and separate electrical conductor means connecting to the electrodes and extending externally of the enclosure.

Essentially fuel cells consist of two catalyst-electrodes spaced from each other and emerged in a pressurized container of electrolyte. For greater efficiency, the space between the two electrodes must be impermeable to gases but permeable to the flow of ions. Electricity is manufactured in the cell basically by the contact of gases with the catalyst-electrodes wherein the absorbed molecular gas is converted to atoms and then ionized. Therefore it is important that the electrode configuration be such that maximum contact is obtained between the electrodes and the gas passing through the cell. At the same time, the electrode, being constructed, as previously indicated, most typically of porous material, must be of a design affording structural rigidity. It is the object of this invention to provide an improved structural arrangement for electrodes for fuel cells satisfying in a highly improved manner the above requirements.

Figure 1:
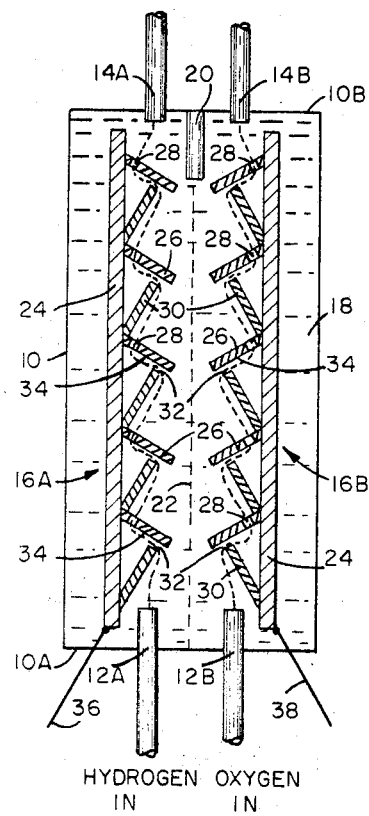
FIGURE 1 is a schematic cross-sectional view of a fuel cell embodying the principles of this invention.

Referring now to FIGURE 1, a fuel cell diagrammatically representing the invention is shown. The cell consists basically of a pressure containing enclosure 10 having two spaced inlet openings 12A and 12B in the bottom thereof. In the top of enclosure 10 are two spaced outlet openings 14A and 14B. Positioned in the interior of the enclosure 10 are two spaced apart electrodes, generally indicated by the numerals 16A and 16B. The enclosure 10 is filled with a liquid electrolyte solution 18. The cell functions, as an example, by the admission of hydrogen into inlet 12A and oxygen into inlet 12B. The gases pass upwardly contacting electrodes 16A and 16B. The chemical action of the contact of the gas with the catalyst-electrodes results in ion flow, the electrolyte 18 providing a conveyor for such ionic flow between electrodes. The gas, after passing electrodes 16A and 16B, escapes out gas outlets 14A and 14B.

The object of the invention exemplified by FIGURE 1 is to provide increased contact between the gas and electrodes while at the same time preventing as far as possible any diffusion of gas within the enclosure which diminishes the efficiency of the cell.

To separate gas outlets 14A and 14B, a downwardly extending baffle plate 20 may be provided affixed to the top 10B of the enclosure. To further prevent diffusion of the gas in electrolyte 18, an ion permeable membrane 22 may be provided between the spaced electrodes 16A and 16B.

The novelty of this invention lies not in the method of operation of the cell but in the configuration of the electrodes. Basically, each electrode 16A and 16B consists of an upstanding back plate 24. To the back plate 24 are affixed a plurality of downwardly slanted plates 26. Preferably each of the back plates 24 are spaced from and parallel to each other. The upper or higher end of each of the downwardly slanted plates 26 is affixed to the back plate 24 and at least one opening 28 is provided in each of the downwardly slanted plates 26 adjacent the back plate. The third series of elements of each of the electrode structures is a plurality of paralleled upwardly slanted plates 30, each affixed at the lower end to the back plates 24. The upwardly slanted plates 30 are preferably equally spaced from each other. In the preferred embodiment, as shown, the lower end of the upwardly slanted plates 30 and the upper end of the downwardly slanted plates 26 are affixed to the back plates adjacent to each other. It can be seen that the upwardly slanted plates 30 and the downwardly slanted plates 26 may be affixed to each other in substantially an L shape configuration and then the L-shaped element affixed to back plate 24. It is not essential to the invention to specifically place the point of attachment of the plates 26 and 30 to the back plate as long as the arrangement exemplified in the drawing is preserved.

The upper end 32 of each of the upwardly slanted plates 30 terminates adjacent to the lower surface 34 of the downwardly slanted plates 26.

The plates 26 and 30 of each of the electrodes 16A and 16B are positioned over the gas inlets 12A and 12B and under the gas outlets 14A and 14B.

As gas such as hydrogen enters the cell through inlet 12A, it first contacts the lower surface of an upwardly inclined plate 30. Reaching the upper end 32 of the upwardly inclined plate 30, the gas engages the lower surface 32 of a downwardly inclined plate 26 and travels along this surface until an opening 28 is reached. The gas passes through opening 28 and travels along a lower surface of the next upwardly inclined plate 30 until it reaches the end thereof and again encounters the lower surface 34 of downwardly inclined plate 26. This sequence is repeated for both the gas entering the cell through inlets 12A and 12B. In this manner, the gas is caused to pass adjacent to the full length of the surfaces of both the upwardly and downwardly inclined plates 26 and 30.

It is understood that the plates 26 and 30, as well as the back plates 24, may be constructed of any material adapted to function as a catalyst-electrode. In most instances, such material is preferably the porous type so that the gas contacts not only the exterior surface of the plates 26 and 30 but permeates therethrough for highly increased total contact with the electrodes.

Figure 2:
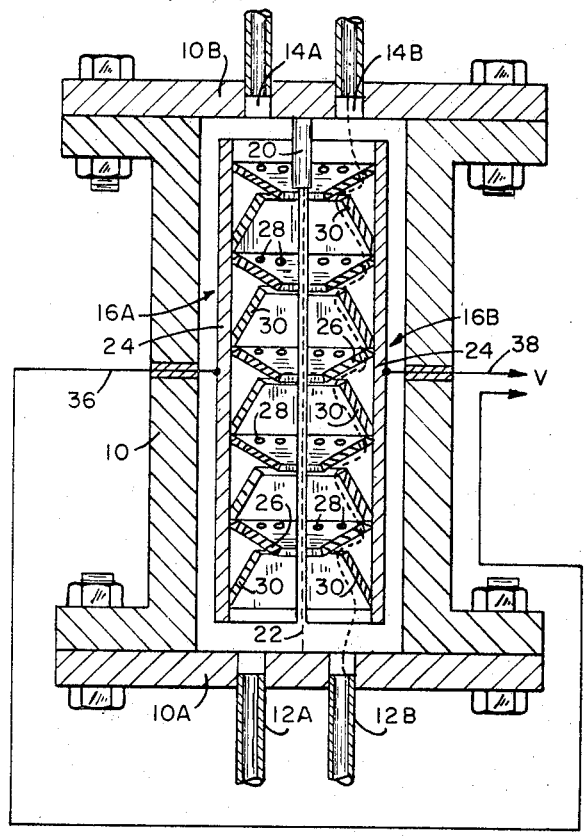
FIGURE 2 is a cross-sectional view of a fuel cell embodying the principles of this invention particularly showing the electrode structures as arranged for efficient utilization of the space within a cylindrical cell enclosure.

Referring now to FIGURE 2, a more specific and functionable arrangement of the basic concept of the invention is shown. In FIGURE 2, the enclosure 10 is cylindrical and is closed with a flange forming the bottom 10A and an upper flange forming the top 10B. The electrodes 16A and 16B of FIGURE 2 are arranged so that the back plates 24 are semi-circular. The downwardly extending plates 26 and upwardly extending plates 30 are in the form of a relatively thin semi-frusto-conical shape. As shown in FIGURE 2, a multiplicity of openings 28 may be provided in each of the downwardly extending plates 26.

The function of the fuel cell of FIGURE 2 is the same as that of the construction of FIGURE 1. The utilization of semi-tubular back plates 24 and semi-frusto-conical plates 26 and 30 provides a structure most fully utilizing the interior of a tubular enclosure 10. At the same time, the arrangement of FIGURE 2 provides a structure which is inherently endowed with rigidity particularly important when the electrode members are composed of relatively brittle and fragile porous materials.

Figure 3:
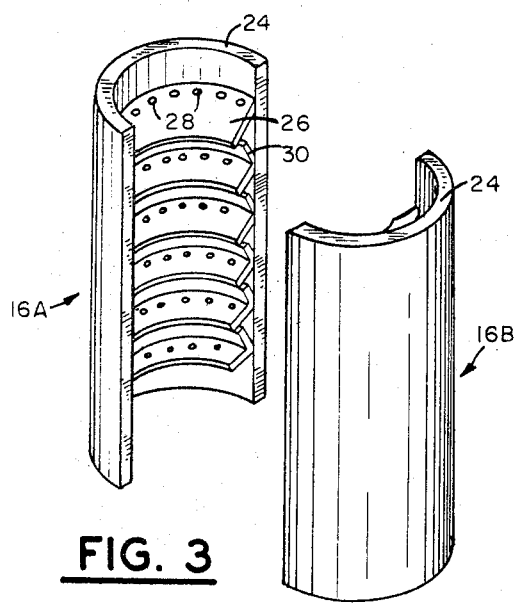
FIGURE 3 is an isometric view of two electrodes as utilized in the embodiment of FIGURE 2.

FIGURE 3 is an isometric view of the electrode members 16A and 16B as utilized in the fuel cell of FIGURE 2. It is understood that the embodiment set forth herein is for the purpose of exemplification and not limitation. The degree of departure from the horizontal of both the upwardly and the downwardly slanted plates 26 and 30 may vary considerably. The structural arrangement of electrodes of this invention may be utilized in any type of fuel cell wherein gases are caused to contact electrodes in an electrolyte solution. The construction of the electrodes may vary within the scope of this invention, for instance, each of the total electrodes 16A and 16B may be composed throughout of the same material or the back plates 24 may be composed of a material utilized only for electrical conductivity purposes while the plates 26 and 30 may be of porous catalyst type of electrode material.

As shown in both FIGURES 1 and 2, the cell is completed by the provision of conductors 36 and 38 which are affixed to the electrodes 16A and 16B and extends sealably externally of the enclosure 10 whereby the electrical energy generated within the cell is conducted away.

Although this invention has been described with a certain degree of particularity, it is manifest that many changes may be made in the details of construction and the arrangement of components without departing from the spirit and scope of this disclosure.

What is claimed:
1. A fuel cell comprising:
    (a) an upright pressure containing enclosure having spaced apart gas inlets in the bottom and spaced apart gas outlets in the top;
    (b) a first and a second spaced apart upright electrode positioned in said enclosure, each of said electrodes having
        (1) an upright back plate member,
        (2) a plurality of downwardly slanted plates each affixed at the higher end to said back plate, said downwardly slanted plates substantially equally spaced from and parallel to each other and each having at least one opening therein adjacent the end affixed to the back plate, and
        (3) a plurality of paralleled upwardly slanted plates each affixed at the lower end to said back plate, the upper outer end of each of said upwardly slanted plates terminating adjacent to the lower surface of one of said downwardly slanted plates, said plates of each electrode extending over one of said gas inlet openings in the bottom of said enclosure and under one of said gas outlet openings in the top of said enclosure; and
    (c) separate electrical conductor means connecting to said electrodes and extending externally of said enclosure.
2. A fuel cell according to claim 1 including
    (d) a downwardly extending baffle plate affixed to the inner top of said enclosure between said gas outlets.
3. A fuel cell according to claim 1 including:
    (d) an ion conducting membrane between said first and second electrodes.
4. A fuel cell comprising:
    (a) an upright pressure containing enclosure having spaced apart gas inlets in the bottom and at least one gas outlet opening in the top;
    (b) a first and a second spaced apart upright electrode positioned in said enclosure, each of said electrodes having
        (1) an upright semi-tubular back plate,
        (2) a plurality of paralleled spaced downwardly slanted relatively thin semi-frusto-conical plates affixed at their convex edge to the concave surface of said back plates, each having at least one opening therein adjacent the convex edge, and
        (3) a plurality of spaced apart paralleled upwardly slanted relatively thin semi-frusto-conical plates affixed at their convex edge to the concave surface of said back plates, the upper outer edge of each of said upwardly slanted plates terminating adjacent the lower surface of an adjacent downwardly extending plate, said plates of each electrode extending over one of said gas inlet openings in said enclosure; and
    (c) separate electrical conductor means connecting to said electrodes and extending externally of said enclosure.
5. A fuel cell according to claim 4 including
    (d) a downwardly extending baffle plate affixed to the inner top of said enclosure between said gas outlets.
6. A fuel cell according to claim 4 including
    (d) an ion conducting membrane between said first and second electrodes.

References Cited

UNITED STATES PATENTS 3,215,562  11/1965  Hardin _____ 136—86
3,297,485  1/1967   Tocker _____ 136—86

ALLEN B. CURTIS, *Primary Examiner.*